US005615261A

United States Patent [19]

Grube et al.

[11] Patent Number: 5,615,261

[45] Date of Patent: Mar. 25, 1997

[54] METHOD AND APPARATUS FOR DETECTING ILLICIT RF DATA TRANSMISSIONS

[75] Inventors: Gary W. Grube, Palatine, Ill.; Timothy W. Markison; Mathew A. Rybicki, both of Austin, Tex.

[73] Assignee: Motorola, Inc., Schaumburg, Ill.

[21] Appl. No.: 318,415

[22] Filed: Oct. 5, 1994

[51] Int. Cl.[6] .......... H04L 9/00

[52] U.S. Cl. .......... 380/2; 380/23; 380/25; 380/49

[58] Field of Search .......... 380/1, 2, 4, 10, 380/23, 25, 49, 50

[56] References Cited

U.S. PATENT DOCUMENTS 4,672,572 6/1987 Alsberg .......... 380/23
5,204,897 4/1993 Wyman .......... 380/4
5,388,211 2/1995 Hornbuckle .......... 380/4 X

*Primary Examiner*—Bernarr E. Gregory
*Attorney, Agent, or Firm*—Christopher P. Moreno

[57] ABSTRACT

Detection of illicit radio frequency (RF) data transmissions is accomplished by employing an RF security monitor (120) positioned within the transmission range of a wireless communication system (101). As a first RF node (109) communicates data to a second RF node (111 ) via an RF communication path (115), the RF security monitor (120) monitors this communication to determine whether it is an illicit RF data communication. Illicit RF data communications may include, but are not limited to, a particular data type that should not be transmitted over a wireless channel, or data transmitted with an improper security level. When an illicit RF data communication occurs, the RF security monitor (120) sends a message to a data distributor (104) informing the data distributor (104) of the illicit RF transmission. Typically, the data distributor (104) will respond with an instruction as to how this and subsequent illicit RF transmissions are to be handled.

20 Claims, 2 Drawing Sheets

METHOD AND APPARATUS FOR DETECTING ILLICIT RF DATA TRANSMISSIONS

TECHNICAL FIELD OF THE INVENTION

The present invention relates generally to data distribution and in particular to a method and apparatus for detecting illicit data transmissions.

BACKGROUND OF THE INVENTION

Wireless communication systems are known to include a plurality of communication units, a limited number of wireless communication resources, and a communication resource controller. A typical communication unit, which may be a mobile radio, portable radio, or radio/telephone, offers its user a variety of features, such as group calls (i.e., one-to-many communications), telephone interconnect calls (i.e., one-to-one communications), and data communications. To access one of these services, the user must request access to one of the limited number of wireless communication resources and specify the type of service requested. This request is sent from the communication unit to the communication resource controller via a control channel, wherein the control channel is one of the communication resources that has been selected to function as the control channel. Upon receiving the request, the communication resource controller determines whether this particular communication unit is authorized to access the requested service and, if so, whether a communication resource is available for allocation. When both conditions are positive, the communication resource controller allocates a communication resource to the requesting communication unit such that the user can access the requested service.

In addition to allocating a communication resource, the communication resource controller may also need to establish a communication path within a public data communication interconnect system, such as a public switch telephone network (PSTN), to complete the service request. For example, if the requested service is for a data communication, in which the user is requesting that a data file be transferred to it via the wireless communication system, the communication resource controller would need to allocate a wireless communication resource to the requesting communication unit and also establish a wireline communication path with the holder of the requested data file via the public data system. Once both of these communication paths (i.e., the wireless path and the wireline path) have been established, the requested data file can be transferred to the requesting communication unit.

The above described data transfer is becoming more and more common as technological advances occur in both the wireless art and the wireline art. These technologic advances are allowing more data to be transferred in less time via data compression, time division multiplexing, quadrature amplitude modulation techniques, ADSL, MPEG standards, ISDN, and spread spectrum techniques. As the amount and frequency of data transmissions increase, so does the chance for illicit transmissions of the data. Illicit transmissions of data, which may include video data (i.e., movies), audio data (i.e., music or conversations), data files (e.g.. police files, books, etc.), occur when a transceiver has an unauthorized copy of data for transmission or transmits authorized data to an unauthorized receiver.

In a typical wireless communication system, unauthorized reception of data is limited by addressing appropriate receiving communication units and instructing them, via the control channel, to affiliate with another communication resource to receive the data transmission. Even though all the communication units within range of the control channel's antenna receive the addressing information, only the communication unit or units that are addressed will affiliate with the communication resource. In an ideal system (i.e., one without units illicitly receiving data transmission), only the authorized communication units receive the requested data. Unfortunately, there are few, if any, ideal systems left, thus illicit reception is a real and serious problem costing the owners of the data millions of dollars in lost revenue.

One solution that reduces illicit receptions is to encrypt the data. Encryption may be a simple encryption algorithm or a complex algorithm. If a simple algorithm is used, e.g. adding an offset to the data, it can be easily decrypted, thus allowing illicit reception. While the complex algorithms are more difficult to decrypt, which prevents unauthorized reception, there is a considerable amount of overhead and complexity which slows the data transfer rate. In addition, wireless communication units do not have a mechanism to determine whether incoming data is sensitive or not. Thus, the communication unit uses whatever encryption/decryption algorithm that is currently loaded to encrypt/decrypt communications, which, for some communications is overkill and for others, jeopardizes its security. Also, there is currently no mechanism that determines whether a proper security level is being used or whether such data should even be transmitted due to its sensitive nature.

Therefore, a need exists for a method and apparatus that prevents illicit wireless data transmissions based on the sensitivity of the data being transmitted and insures that the proper security level is used.

BRIEF DESCRIPTION OF THE DRAWINGS

FIG, 2 illustrates a schematic block diagram of an RF security monitor in accordance with the present invention.

DETAILED DESCRIPTION OF A PREFERRED EMBODIMENT

Generally, the present invention provides a method and apparatus for detecting illicit radio frequency (RF) data transmissions. This is accomplished by employing an RF security monitor positioned within the transmission range of a wireless communication system. As a first RF node communicates data to a second RF node via an RF communication path, the RF security monitor monitors this communication to determine whether it is an illicit RF data communication. Illicit RF data communications may include, but are not limited to, a particular data type that should not be transmitted over a wireless channel, or data transmitted with an improper security level. When an illicit RF data communication occurs, the RF security monitor sends a message to a data distributor informing the data distributor of the illicit RF transmission. Typically, the data distributor will respond with an instruction as to how this and subsequent illicit RF transmissions are to be handled. With such a method and apparatus, illicit RF transmissions of data within a wireless communication system can be identified and subsequently prevented, thereby insuring that sensitive data is adequately protected.

Figure 1:
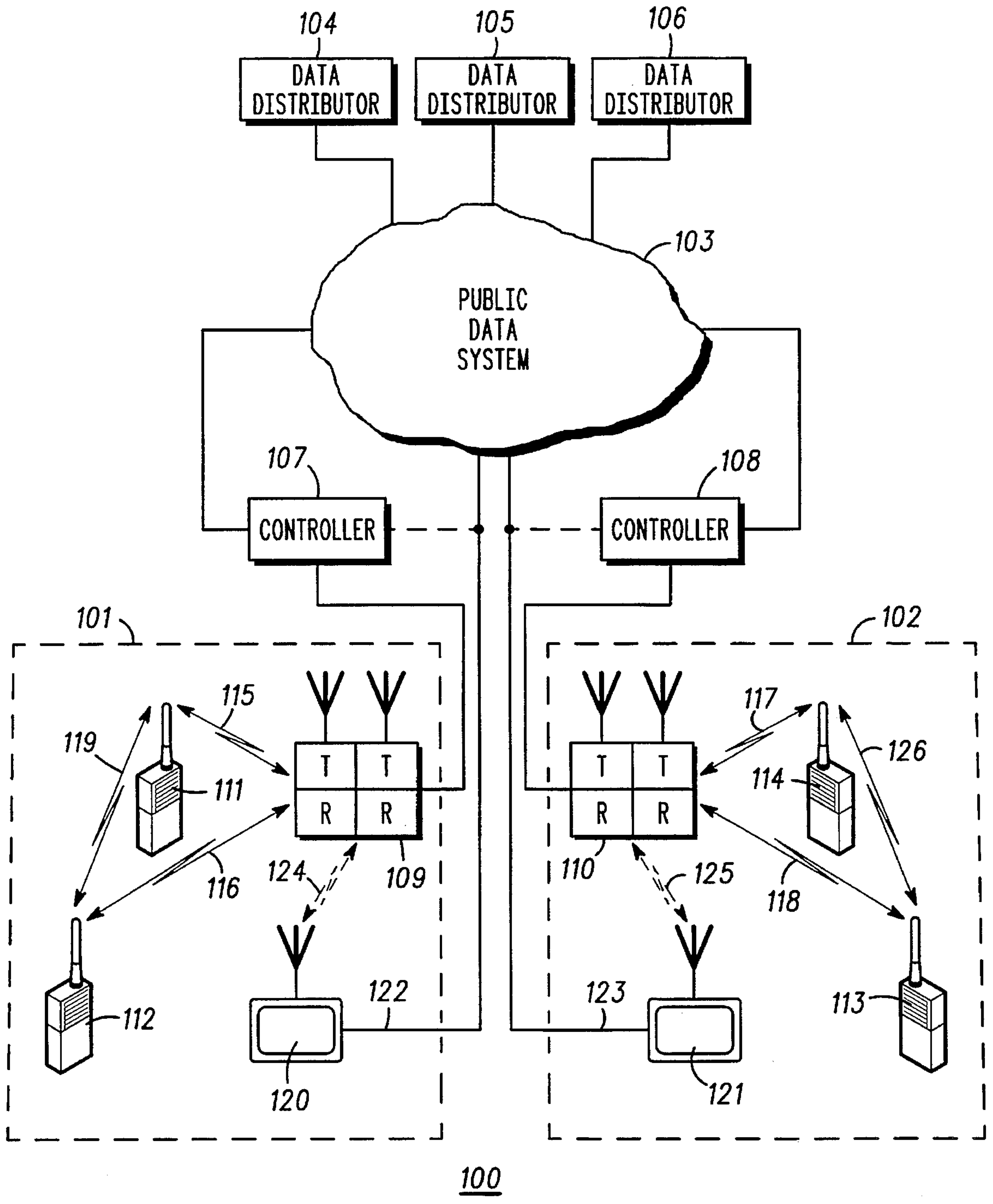
FIG. 1 illustrates a communication environment in accordance with the present invention.

FIG. 1 illustrates a multi-medium communication environment 100 that includes wireless communication systems 101–102, a public data system 103, and data distributors 104–106. Each of the wireless communication systems 101–102 includes a controller 107–108, an RF base transceiver 109–110, communication units 111–114, system RF communication paths 115–118, local RF communication paths 119, 126, and RF security monitors 120–121. Each of the RF security monitors 120–121 comprise a wireless receiver, or transceiver, capable of matching the data formatting technique and modulation technique of the communication units 111–114 and the RF base transceivers 109–110. For example, if the wireless system 101 is using a data formatting technique of Time Division Multiplexing (TDMA) and a modulation technique of 16 bit Quadrature Amplitude Modulation (QAM), the RF security monitor 120 would be a receiver, or transceiver, designed to communication information using these communication parameters. Other data formatting techniques may include Frequency Division Multiplexing (FDMA), Code Division Multiplexing (CDMA), while other modulation techniques may be 4 bit QAM, Frequency Modulation (FM), or Amplitude Modulation (AM).

With the RF security monitors 120–121 matching the communication parameters of their respective wireless communication systems 101–102, they are then coupled to the public data system 103 either via a wireline path 122–123 or a wireless path 124–125 of the wireless communication system 101–102. Regardless of the means that couples the RF security monitors 120–121 to the public data system 103, the RF security monitor 120–121 provide information to the data distributors 104–106 regarding distribution of their data within the wireless communication systems 101–102.

In operation, a communication unit, such as communication unit 111, transmits a request for data to the controller 107 via a control RF communication path and the RF base transceiver 109. The control RF communication path, or control channel, is one of the RF communication paths within the communication system 101 that has been designated to act as the control channel. Typically, the RF communication paths will be TDMA, FDMA, or CDMA channels transceived via the RF base transceiver 109. The RF base transceiver 109, or the RF base transceiver 110, may comprise TDMA, FDMA, CDMA access with varying modulation schemes, or any other type of RF transceiver operating in a frequency band such as to provide wireless communication paths 115–118 to geographically mobile communication units 111–114 within some area of desired operation. One such example of a RF base transceiver is a iDEN™ Base Station manufactured by Motorola, Inc.

Upon receiving the request from the communication unit 111, the controller 107 interprets the request to determine the identity of the requesting unit, the type of request, and identity of the target (i.e., from whom the data is requested). Having determined this information, the controller 107 verifies that the communication unit 111 is authorized to access the requested service and whether a wireless communication resource, or RF communication path, is available for allocation. If both inquiries are valid, the controller 107 routes the request to the target. To perform these functions, the controller 107, and controller 108, should comprise a radio system controller as is well known in the art, such as a Dispatch Application Processor manufactured by Motorola, Inc. routes, the request to the targeted data distributor via the public data system If the target is one of the data distributors 104–106, the controller 107 103. (Assume, for purposes of discussion, that the targeted data distributor is data distributor 104.) To insure that the request will be routed to the data distributor 104, the public data system 103 should comprise an Asynchronous Transfer Mode (ATM) network, an X.25 data network or a multitude of other data networks capable of transferring requests for data and the distribution data payload between any distributor and any client system such as a wireless communication unit 111–114 operating within a wireless communication system 101, 102.

Upon receiving the request, the data distributor 104 interprets the request to determine the identity of the requesting unit and the identity of the data requested. If the requesting unit is verified as a subscriber to the data distributor 104 and the data distributor 104 has the requested data, which may be digitally stored video information, digitally stored data information, digitally stored multimedia information, or digitally stored audio information, the data distributor 104 sends the requested data to the controller 107 via the public data system 103. Note that the data distributor 104 generally does not know whether the requesting unit is affiliated with a wireless communication system or a wireline system.

Upon receiving the requested data, the controller 107 routes the requested data to the communication unit 111 via the allocated RF communication resource and the RF base transceiver 109. In this data transmission, the RF base transceiver 109 is acting as a first RF node, while the communication unit 111 is acting as the second RF node. It's this data transmission that the RF security monitor 120 is monitoring to determine whether it is an illicit data transmission, where an illicit data transmission may be a data transmission occurring at an incorrect security level, or one that should not be transmitted over an RF communication path, i.e., not of an anticipated transmission type.

In the above mentioned data transmission, the RF security monitor 120 is not specifically addressed, but is programmed to receive any RF transmission within the wireless communication system 101. To monitor the data transmission, the RF Security Monitor 120 tunes its frequency and modulator to that being used by communication unit 111. Thus far, the discussion has focused on the RF security monitor 120 monitoring only one data transmission, but, it should be apparent to one skilled in the art that the RF security monitor 120 could have a plurality of receivers, or transceivers, that contemporaneously monitor a plurality of data transmissions. For example, the RF security monitor 120 could have as many receivers, transceivers, as the wireless communication system 101 has RF communication resources.

As mentioned, the RF security monitor 120 monitors the data transmission to determine whether it is an illicit data transmission. To make this determination, the RF security monitor 120 extracts transmission information from the data transmission, wherein the transmission information includes identity of the data, identity of the data distributor, identity of the second RF node, and security level of the transmission. The transmission information is compared to data stored in a transmission information data base. If the transmission information does not correspond to the information stored in the data base, the RF security monitor 120 flags this data transmission as an illicit transmission and forwards a message indicating the same to the data distributor 104.

To one skilled in the art, it will be apparent that an almost endless combination of transmission parameters may be stored in the transmission information data base and used to determined the illicit data transmission. Transmission parameters may include levels of security, types of data, types of users, authorized data transmission information, wireless or wireline system, type of data distributor, or subscriptions. As an illustrative example, assume that the requested data is a movie video and the security level is one in which the data should be encrypted if it is being sent over a wireless path and can be unencrypted when sent over a wireline path. Thus, if the data is being transmitted in the wireless system 101 and is not encrypted, the RF security monitor will determine this and flag it as an illicit data transmission. As another illustrative example, some data may be so sensitive that is should not be transmitted over a wireless path, thus, if the RF monitor detects this information, it will flag it as an illicit data transmission because it is not of an anticipated transmission type.

When a data transmission is an illicit transmission, the RF security monitor 120 transports a message to the data distributor 104. The message may be transmitted over a wireless communication path 124 to the controller 107 which routes the message through the public data system 103 to the data distributor 104. An alternate communication path has the RF security monitor 120 coupled to the data distributor 104 via a wireline link 122 to the public data system 103. Regardless of how the RF security monitor 120 is coupled to data distributor 104, upon receiving the message, the data distributor 104 may generate an instruction, wherein the instruction may prohibit the current or subsequent transmissions, prevent the second RF node from receiving the transmission, or change the security level of the transmission.

The data distributor's instruction may be routed to the first RF node, the second RF node or the RF monitor. The first or second RF node will receive the message from the controller 107, while the RF security monitor may receive the instruction from the controller 107 or the wireline connection to the public data system 103. For example, if the data transmission is determined to be illicit because the second RF node is not authorized to receive the RF transmission, the instruction may be sent directly to the second RF node, wherein the instruction prevents the second RF node from requesting that type of data transmission in the future, or terminating the current reception of the RF transmission. Alternatively, the instruction may be sent to the first RF node instructing the first RF node not to transmit this data to the second RF node in the future, to terminate the current data transmission to the second RF node, or that the first RF node is not to transmit this data to any communication unit. Yet another alternative is to send the instruction to the RF security monitor, which would then relay the instruction to the appropriate RF node.

The preceding discussion has focused on the second RF node (i.e., the communication unit 111 ) receiving the data transmission from the first RF node (the controller 107 and the RF base transceiver 109). While this is the primary manner in which data transmissions will occur, the communication unit 111 may also receive a data transmission from another communication unit, say communication unit 112. In this instance, communication unit 112 is the first RF node which is transmitting data over RF communication path 119 to communication unit 111, which is acting as the second RF node. The RF Security Monitor 120 will monitor the wireless communications path 119 and provide the above described message to the data distributor 104.

Figure 2:
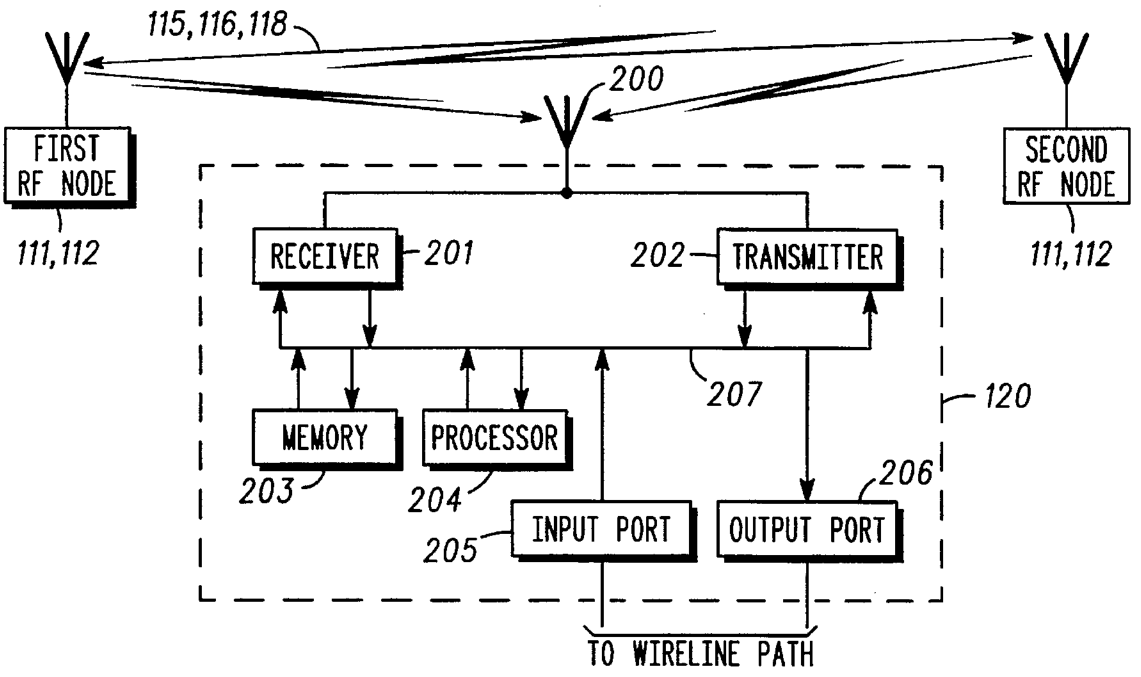

FIG. 2 illustrates a schematic block diagram of the RF security monitor 120–121 and a portion of the environment outside of the RF security monitor 120. As shown, the RF security monitor 120 includes an antenna 200, a receiver 201 or a transceiver 202, memory 203, a processor 204, an input port 205, an output port 206, and an internal data bus 207. The antenna 200 is arranged such that it can monitor RF data transmissions over a particular wireless communication path, such as the wireless communication paths 115–166, 119 that exist between the first RF node and the second RF node. Note that the RF security monitor 120 may include a plurality of antennas and receivers 201 or transceivers 202 for each RF communication path in the associated wireless communication system. Also note that if the RF security monitor is coupled to the data distributor via a wireline path, the RF security monitor may not include the transceiver 202. As a further note, when the RF security monitor is coupled to the data distributor via a wireless path, the RF security monitor may not include the receiver 201, the input port 205, and the output port 206.

In operation, the RF security monitor 120 monitors data transmissions via the receiver 201, or the transceiver 202. (Unless specifically stated, for the remainder of this discussion. the coupling of the RF security monitor to the public data system is not germane, thus the transceiver will be used as the means that provides coupling to the external communication environment even though, for the wireline connection, the actual external coupling means may include the receiver, input port and output port.) While monitoring the data transmission, the transceiver 202 routes the data to the memory 203 which temporarily stores it such that processor 204 can produce the transmission information. The memory 203, which may be any type of integrated circuit memory, or a magnetic or optical storage medium, also stores the transmission information data base.

The processor 204, which may be a 68040 microprocessor manufactured by Motorola, Inc. or another type of microprocessor, compares the transmission information with the predetermined transmission information stored in the transmission information data base. If the transmission data, i.e., the information extracted from the data transmission, does not correspond to the information stored in the transmission information data, the processor 204 determines that the data transmission is an illicit data transmission.

Upon determining that data transmission is illicit, the processor 204 transports a message to the data distributor 104, wherein the message identifies the wireless data transmission as an illicit data transmission. The message may be transmitted by transceiver 202 over a wireless communication path 124 or output port 206 over wireline link 122–123 to the data distributor 104. After the message is sent, the RF security monitor waits for an instruction from the data distributor 104.

Upon receiving the instruction from the data distributor 104, the processor 204 stores the instruction in memory 203 and prepares a command. The command is sent to either the first RF node (such as the RF base transceiver 109 or communication unit 111–112) or the second RF node (such as the communication unit 111–112). For example, if the RF transmission is determined to be illicit because the second RF node is not authorized to receive the RF transmission, the command may be sent to the second RF node, wherein the instruction prevents the second RF node from requesting that type of data transmission in the future, or terminating the current reception of the RF transmission. Alternatively, the command may be sent to the first RF node instructing the first RF node not to transmit this data to the second RF node in the future, to terminate the current RF transmission to the second RF node, or that the first RF node is not to transmit this data to any communication unit.

Figure 3:
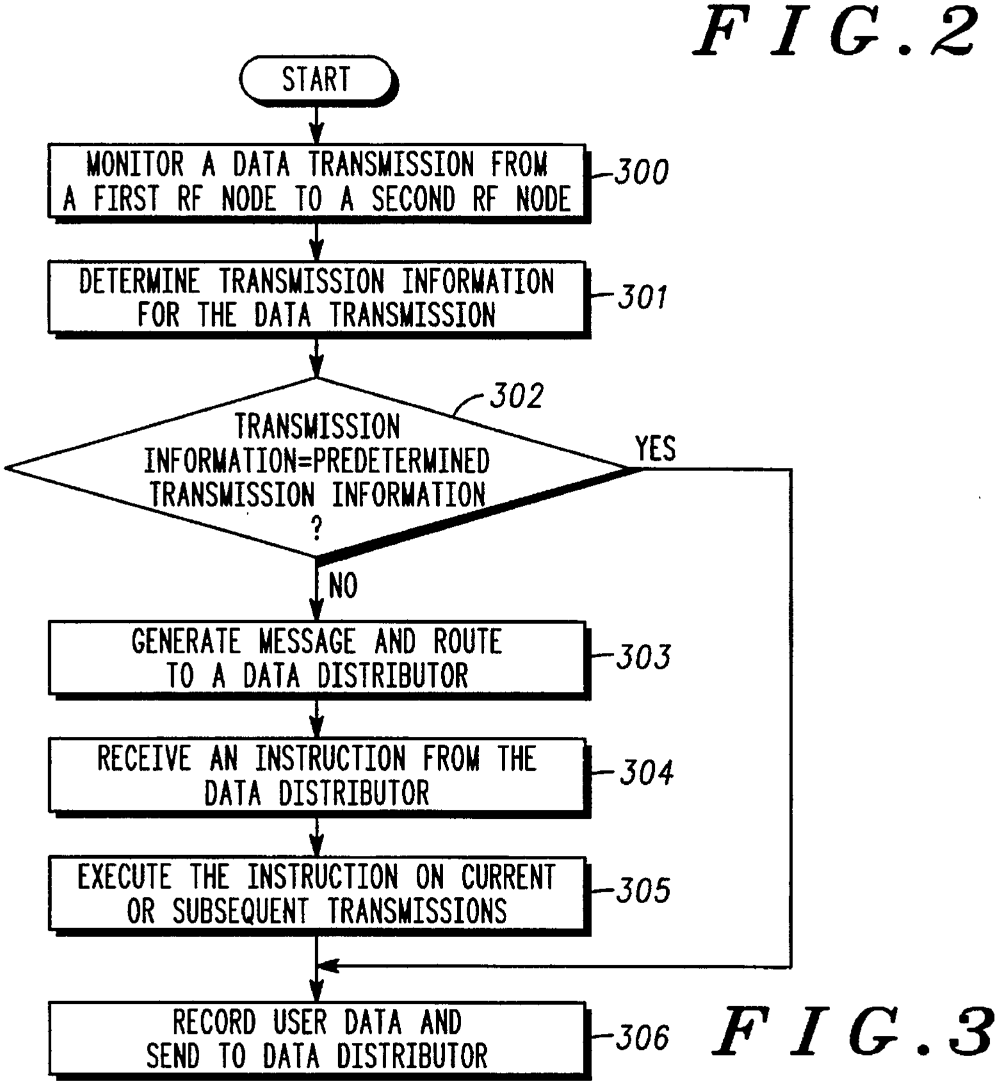
FIG. 3 illustrates a logic diagram that may be used to implement an embodiment of the present invention.

FIG. 3 illustrates a logic diagram that may be used to implement the present invention. At step 300, the RF security monitor 120–121 has tuned its receiver 202 to monitor a data transmission from a first RF node to a second RF node. Next, at step 301 the security monitor 120–121 determines transmission information for the data transmission, such as data information and identification information. At step 302, the RF security monitor compares the transmission information to anticipated transmission information to determine whether the current transmission is anticipated by the stored patterns of data and identification information. The anticipated transmission information is the predetermined transmission information prestored in the memory of the RF security monitor 120–121.

If the transmission information correspond (i.e., compared favorably) to the predetermined transmission information, the process proceeds to step 306 wherein the RF security monitor prepares data use information, stores this information, and subsequently transmits it to the data distributor. The data use information, or user data, includes identity of the unit requesting the data, the type of data requested, when the request was made, how the request was made, and/or the security level of the data transmission.

If, however, the transmission information does not correspond (i.e., compared unfavorably) to the predetermined transmission information, the process proceeds to step 303, in which the RF security monitor generates a message and routes it the data distributor, wherein the message identifies the wireless data transmission as an illicit transmission, i.e., not of an anticipated data type or transmitted at an incorrect security level. After sending the message, the RF security monitor waits for an instruction from the data distributor. At step 304, the data distributor sends the instruction to the RF security monitor 120. Upon receiving the instruction, the RF security monitor executes it as illustrated in step 305, wherein the instruction may be executed on the current transmission and/or on subsequent data transmissions. After the instruction has been executed, user data is compiled and stored in memory of the RF security monitor along with a summary of any subsequent data transmission transactions.

The present invention provides a method and apparatus for detecting illicit RF data transmissions. With such a method and apparatus, illicit data transmissions within a wireless communication system can be identified and subsequently prevented, wherein, illicit data transmission are ones that are not of the proper security level or not to be transmitted via a wireless communication path, thereby insuring that sensitive data is adequately protected.

We claim:

1. A method for detecting illicit RF data transmissions, the method comprising the steps of:

a) monitoring, by an RF security monitor, a data transmission from a first RF node to a second RF node, wherein the data transmission occurs over an RF communication path;

b) determining, by the RF security monitor, whether the data transmission is of an anticipated transmission type;

c) when the data transmission is not of the anticipated transmission type, transporting, by the RF security monitor, a message to a data distributor, wherein the message identifies the data transmission as a transmission not of the anticipated transmission type;

d) receiving an instruction from the data distributor; and e) executing the instruction on at least a subsequent data transmission by the first RF node or to the second RF node.

2. The method of claim 1, wherein step (d) further comprises receiving the instruction by the first RF node, wherein the instruction prohibits the first RF node from transmitting the subsequent data transmission.

3. The method of claim 2, wherein step (d) further comprises prohibiting the first RF node from transmitting the subsequent data transmission to the second RF node.

4. The method of claim 1, wherein step (d) further comprises receiving the instruction by the second RF node, wherein the instruction prohibits the second node from receiving the subsequent data transmission.

5. The method of claim 1, wherein step (d) further comprises receiving the instruction by the RF security monitor, wherein the instruction is at least one of prohibiting the subsequent transmission and preventing the second RF node from receiving the subsequent transmission.

6. The method of claim 5 further comprises forwarding, by the RF security monitor, the instruction to the first RF node or the second RF node based on the instruction.

7. The method of claim 1 further comprises executing the instruction on the data transmission.

8. The method of claim 1, wherein the monitoring of step (a) further comprises determining user data of the data transmission, wherein the user data includes at least one of identity of the second RF node, data type, and a security level of the data transmission.

9. The method of claim 8, further comprises routing the user data to the data distributor.

10. The method of claim 9, further comprises identifying the data type of the data transmission as at least one of digitally stored audio information, digitally stored video information, digitally store data information, or digitally stored multi-media information.

11. A method for detecting illicit RF data transmissions, the method comprising the steps of:

a) monitoring, by an RF security monitor, a data transmission from a first RF node to a second RF node, wherein the data transmission occurs over an RF communication path and has a security level requiring encryption of the data transmission;

b) determining, by the RF security monitor, that the data transmission is not encrypted in accordance with the security level;

c) when the data transmission is not encrypted in accordance with the security level, routing, by the RF security monitor, a message to a data distributor, wherein the message identifies the data transmission as an illicit transmission;

d) receiving an instruction from the data distributor; and e) executing the instruction on at least a subsequent data transmission by the first RF node or to the second RF node.

12. The method of claim 11, wherein step (d) further comprises receiving the instruction by the first RF node, wherein the instruction prohibits the first RF node from transmitting the subsequent data transmission.

13. The method of claim 12, wherein step (d) further comprises prohibiting the first RF node from transmitting the subsequent data transmission to the second RF node.

14. The method of claim 11, wherein step (d) further comprises receiving the instruction by the second RF node, wherein the instruction prohibits the second node from receiving the subsequent data transmission.

15. The method of claim 11, wherein step (d) further comprises receiving the instruction by the RF security monitor, wherein the instruction is at least one of prohibiting the subsequent transmission and preventing the second RF node from receiving the subsequent transmission.

16. The method of claim 15 further comprises forwarding, by the RF security monitor, the instruction to the first RF node or the second RF node based on the instruction.

17. An apparatus for monitoring illicit RF data transmissions, the apparatus comprising:

an RF receiver that monitors a data transmission from a first RF node to a second RF node, wherein the data transmission occurs over an RF transmission path;

memory that stores predetermined transmission information; processing unit that is coupled to the RF receiver and the memory, wherein the processing unit determines transmission information based on the data transmission and wherein the processing unit generates a message when the transmission information compares unfavorably with the predetermined transmission information; and output port coupled to the processing unit, wherein the output port provides a connection to a wireline link and wherein the message is transported to a data distributor via the wireline link.

18. The apparatus of claim 17 further comprises an input port coupled to the processing unit, wherein the input port receives an instruction from the data distributor via the wireline path.

19. The apparatus of claim 18, wherein the processing unit is coupled to the input port and wherein the processing unit executes the instruction.

20. The apparatus of claim 18 further comprises an RF transmitter that is coupled to the processing unit, wherein the processing unit routes the instruction to at least the first RF node or the second RF node via the RF transmitter.

* * * * *